(12) United States Patent  
Urano et al.

(10) Patent No.: US 9,716,816 B2  
(45) Date of Patent: Jul. 25, 2017

(54) IMAGING APPARATUS WITH A LIGHT SHIELDING COVER

(71) Applicant: PANASONIC INTELLECTUAL PROPERTY MANAGEMENT CO., LTD., Osaka (JP)

(72) Inventors: Seiji Urano, Fukuoka (JP); Hirokazu Tasaka, Fukuoka (JP); Akito Omata, Fukuoka (JP)

(73) Assignee: PANASONIC INTELLECTUAL PROPERTY MANAGMENT CO., LTD., Osaka (JP)

( * ) Notice: Subject to any disclaimer, the term of this patent is extended or adjusted under 35 U.S.C. 154(b) by 0 days.

(21) Appl. No.: 15/001,669

(22) Filed: Jan. 20, 2016

(65) Prior Publication Data

US 2016/0255255 A1    Sep. 1, 2016

(30) Foreign Application Priority Data

Feb. 26, 2015    (JP) .................................. 2015-036940

(51) Int. Cl.
*H04N 5/225*    (2006.01)
*H04N 5/33*    (2006.01)

(52) U.S. Cl.
CPC ......... *H04N 5/2254* (2013.01); *H04N 5/2252* (2013.01); *H04N 5/2256* (2013.01); *H04N 5/33* (2013.01)

(58) Field of Classification Search
CPC ...... H04N 5/2254; H04N 5/2256; H04N 5/33; H04N 5/2252; H04N 5/2259
USPC ................................................ 348/372–376
See application file for complete search history.

(56) References Cited

U.S. PATENT DOCUMENTS

| 7,697,035 | B1 * | 4/2010 | Suber, III | H04N 5/2252 348/211.2 |
| 8,525,880 | B2 * | 9/2013 | DiPoala | G08B 17/00 348/143 |
| 9,195,118 | B2 * | 11/2015 | Okamura | H04N 5/2252 |
| 9,628,683 | B2 * | 4/2017 | Chu | H04N 5/2254 |
| 2006/0023113 | A1 * | 2/2006 | Lin | G08B 13/1963 348/373 |

(Continued)

FOREIGN PATENT DOCUMENTS

JP    2001-145004    5/2001

OTHER PUBLICATIONS

U.S. Appl. No. 15/001,535 to Seiji Urano et al., filed Jan. 20, 2016.

*Primary Examiner* — Pritham Prabhakher
(74) *Attorney, Agent, or Firm* — Greenblum & Bernstein, P.L.C.

(57) ABSTRACT

An imaging apparatus includes a dome cover whose inside is a housing space for housing a lens module, an apparatus main body that is attached with the dome cover, a first support member that is supported at the apparatus main body in a free pan rotation manner inside the dome cover, a second support member that is supported at the first support member in a free tilt rotation manner and supports the lens module, an illumination mount that is provided with an illumination member and is supported at the second support member, and a ring-shaped light shielding cover that is provided on the illumination mount, surrounds the illumination member, and comes into close contact with an inner surface of the dome cover.

12 Claims, 15 Drawing Sheets

(56) References Cited

U.S. PATENT DOCUMENTS

| | | | | |
|---|---|---|---|---|
| 2011/0158637 A1* | 6/2011 | Jung | ................ | G03B 15/03 |
| | | | | 396/535 |
| 2013/0169805 A1* | 7/2013 | Park | ................ | G08B 13/19619 |
| | | | | 348/143 |
| 2014/0044427 A1* | 2/2014 | Huang | ................ | G03B 15/03 |
| | | | | 396/176 |
| 2014/0301729 A1* | 10/2014 | Okamura | ................ | H04N 5/2252 |
| | | | | 396/427 |
| 2014/0339442 A1* | 11/2014 | Huang | ................ | G03B 15/05 |
| | | | | 250/495.1 |
| 2015/0049242 A1* | 2/2015 | Kondou | ................ | G03B 17/02 |
| | | | | 348/374 |
| 2015/0288860 A1* | 10/2015 | Chu | ................ | H04N 5/2254 |
| | | | | 348/143 |
| 2016/0088199 A1* | 3/2016 | Okamura | ................ | H04N 5/2254 |
| | | | | 348/374 |
| 2016/0335501 A1* | 11/2016 | Huang | ................ | G06K 9/00771 |

* cited by examiner

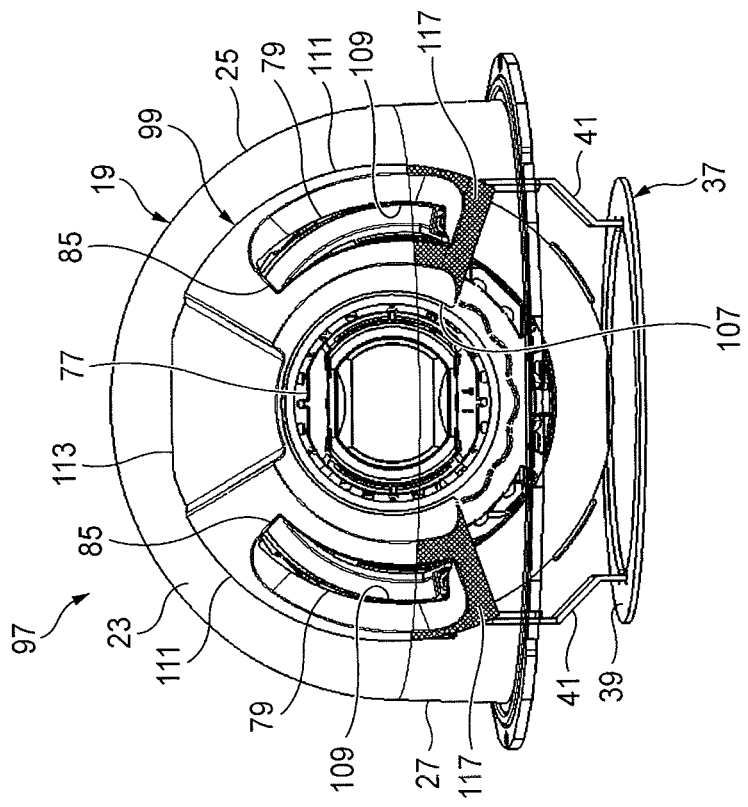
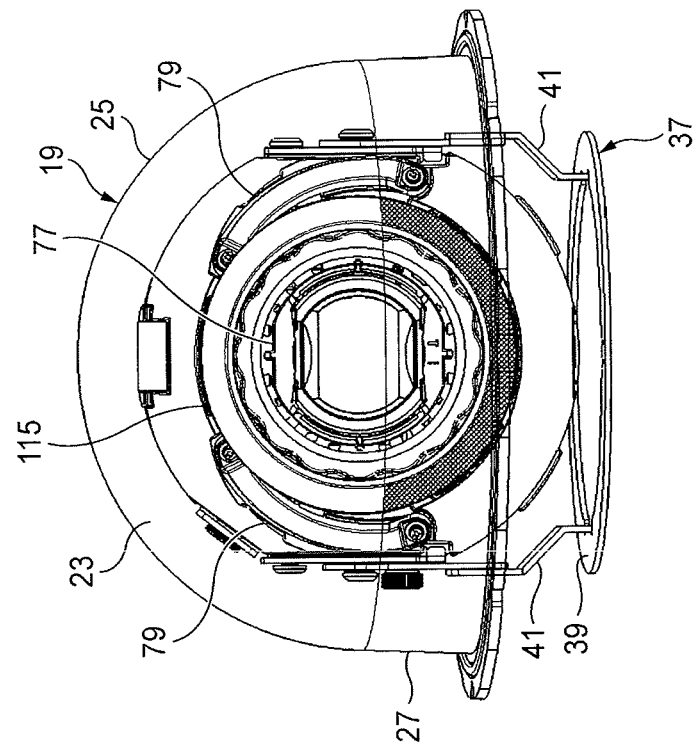

IMAGING APPARATUS WITH A LIGHT SHIELDING COVER

BACKGROUND OF THE INVENTION

1. Field of the Invention

The present invention relates to an imaging apparatus.

2. Description of the Related Art

As an imaging apparatus, there is a monitoring camera which is provided with an LED emitting infrared light and can clearly image a monitoring area even when an environment is dark such as the nighttime (refer to Japanese Patent Unexamined Publication No. 2001-145004 or the like). The monitoring camera is provided with a camera case attached to a main body case so that an angle of the case is adjustable, a camera body installed inside the camera case, a light emitting element disposed on an outer circumference of the camera case, a spherical cover member attached to the main body case and covering the camera case, and a shield member disposed on an outer circumference of an opening of the camera case. The shield member is provided with a shield extending along the cover member with a predetermined gap.

In this monitoring camera, the camera body is installed inside the camera case. The light emitting element is disposed on the outer circumference of the camera case in a plurality. The opening is formed on a front surface of the camera case, and the shield member made of rubber or the like is disposed on the outer circumference of the opening. In other words, the light emitting element as a light emitting side is exposed to the inside of the cover member, and the opening of the camera case as a light receiving side is surrounded by the shield member. The shield is formed in a spherical shape, and a predetermined gap with the cover member is formed.

SUMMARY OF THE INVENTION

An imaging apparatus of the present disclosure includes a dome cover whose inside is a housing space for housing a lens module; an apparatus main body that is attached with the dome cover; a first support member that is supported at the apparatus main body in a free pan rotation manner inside the dome cover; a second support member that is supported at the first support member in a free tilt rotation manner and supports the lens module; an illumination mount that is provided with an illumination member and is supported at the second support member; and a ring-shaped light shielding cover that is provided on the illumination mount, surrounds the illumination member, and comes into contact with an inner surface of the dome cover.

BRIEF DESCRIPTION OF DRAWINGS

FIG. 14A is a perspective view in which the imaging apparatus attached with a large-diameter light shielding cover is viewed from the front side of the lens module;

FIG. 14B is a perspective view in which the imaging apparatus attached with a light shielding cover according to the second exemplary embodiment is viewed from the front side of the lens module.

DETAILED DESCRIPTION OF THE PREFERRED EMBODIMENTS

Hereinafter, exemplary embodiments of the present invention will be described with reference to the drawings.

Circumstances Leading to Obtaining One Embodiment of Present Invention

Prior to description of the embodiments of the present invention, problems of the related art will be described briefly. In the imaging apparatus disclosed in Japanese Patent Unexamined Publication No. 2001-145004, there is a case where reflection of illumination light is insufficiently prevented.

If light shielding is not sufficiently performed for a light emitting element as a light emitting side, light emitted from the light emitting element may be diffused so as to be reflected by the cover member attached to the imaging apparatus, and thus the light may be reflected in various directions. If a gap is generated between the cover member and the shield member (light shielding member) provided around the light emitting element due to tilt rotation or the like of the imaging apparatus in this state, reflected light may enter the lens and may be projected therein. In other words, in a light shielding countermeasure for the light emitting element, it is hard to sufficiently minimize projection of illumination light.

Hereinafter, a description will be made of an imaging apparatus which can improve accuracy of minimizing projection of illumination light.

In the following embodiments, a description will be made of an example of a case where the imaging apparatus is a dome camera apparatus (hereinafter, simply referred to as a "dome camera").

First Exemplary Embodiment

Figure 1:
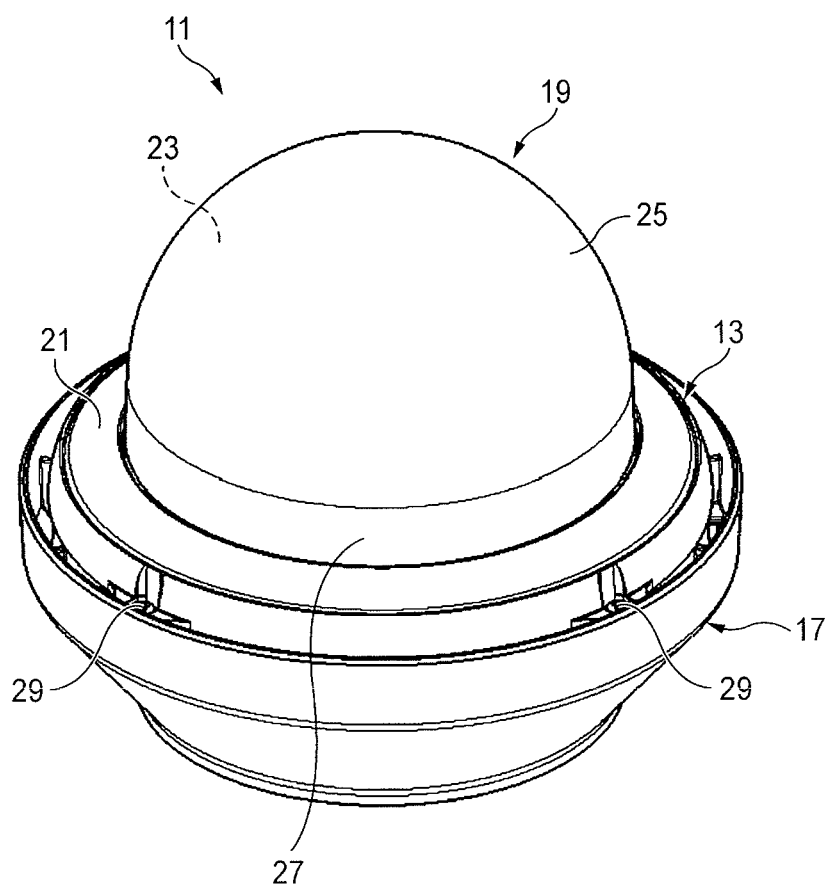
FIG. 1 is a perspective view illustrating an exterior of an imaging apparatus according to a first exemplary embodiment.
Figure 2:
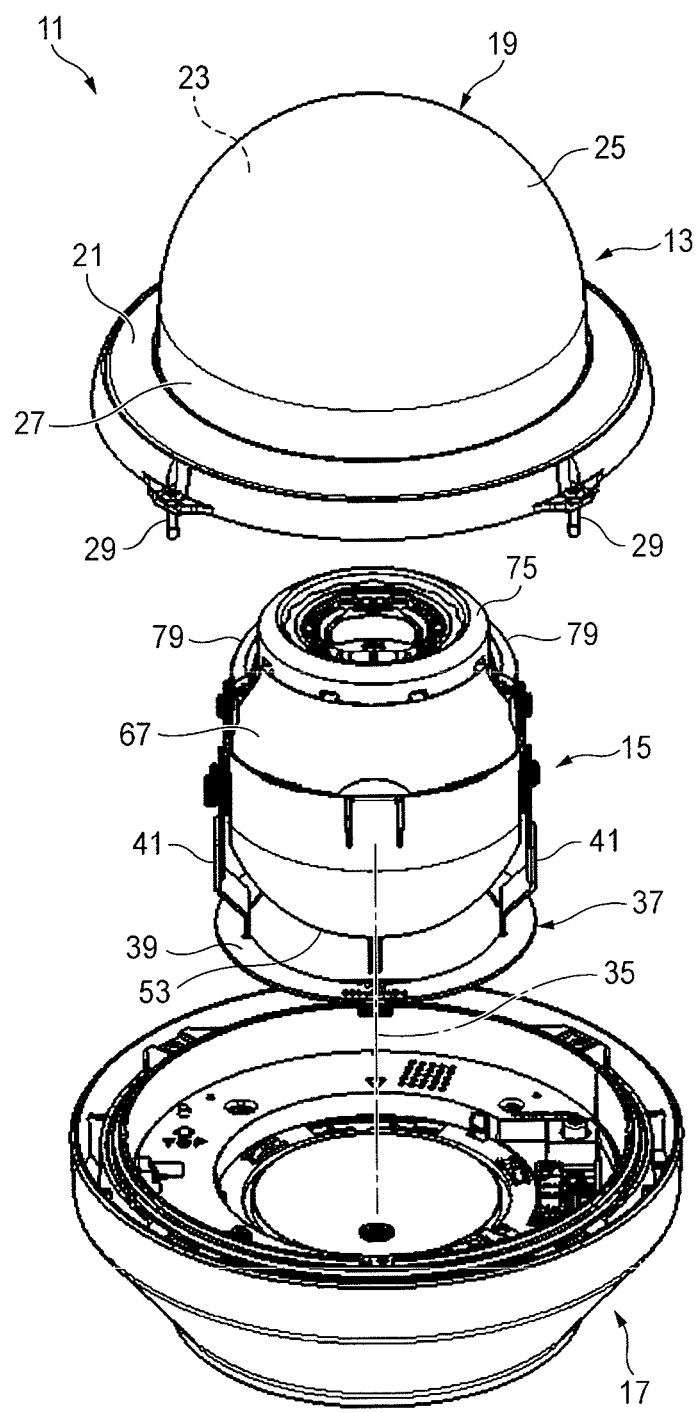
FIG. 2 is an exploded perspective view of the imaging apparatus illustrated in FIG. 1.

FIG. 1 is a perspective view illustrating an exterior of dome camera 11 according to a first exemplary embodiment of the present invention. FIG. 2 is an exploded perspective view of dome camera 11 illustrated in FIG. 1.

Dome camera 11 is roughly constituted of three parts such as dome Assy unit 13, camera Assy unit 15, and camera body Assy unit 17.

In the present embodiment, a "lower side" indicates camera body Assy unit 17 side (a lower part of FIG. 2), and an "upper side" indicates dome Assy unit 13 side (an upper part of FIG. 2). Therefore, in a case where dome camera 11 is attached to a ceiling, the top and bottoms are reversed, and thus dome Assy unit 13 side referred to as the upper side is referred to as the lower side.

Dome Assy unit 13 includes dome cover 19 and dome cover presser 21. Dome cover 19 is made of a polycarbonate resin or the like so as to have impact resistant performance. Lens module housing space 23 is formed inside dome cover 19. Dome cover 19 is provided with cylindrical straight portion 27 continuously formed at an opening edge of hemispherical portion 25. Dome cover presser 21 is formed in a ring shape in which hemispherical portion 25 is inserted into the inside thereof.

Dome cover presser 21 has fixation screws 29 at a plurality of (for example, four) locations in a circumferential direction. Dome cover presser 21 pinches flange 31 (refer to FIG. 9) of the opening edge of straight portion 27 along with seat plate 33, and thus dome cover 19 is fixed to dome cover presser 21. After dome cover 19 is fixed to dome cover presser 21, dome cover presser 21 is fixed to camera body Assy unit 17 by engaging fixation screws 29 therewith. Consequently, dome cover 19 is attached to camera body Assy unit 17.

Camera body Assy unit 17 is attached to, for example, a ceiling, wall, or a support pole of a monitoring camera via a mounting fixture (not illustrated). Camera Assy unit 15 is fixed to camera body Assy unit 17 in a desired pan rotation direction. The pan rotation direction is a rotation direction about a pan rotation central axis perpendicular to, for example, a ceiling surface or a wall surface to which camera body Assy unit 17 is attached. A tilt rotation direction which will be described later is a rotation direction about a tilt rotation axis perpendicular to pan rotation central axis 35. A yaw rotation direction is a rotation direction about lens center axis 81 illustrated in FIG. 3.

In dome camera 11, camera Assy unit 15 is positioned and fixed to camera body Assy unit 17 attached to a ceiling or the like through adjustment of a pan rotation direction, a tilt rotation direction, and a yaw rotation direction. Then, as illustrated in FIG. 1, in dome camera 11, dome Assy unit 13 is attached to camera body Assy unit 17 so as to cover camera Assy unit 15.

Figure 3:
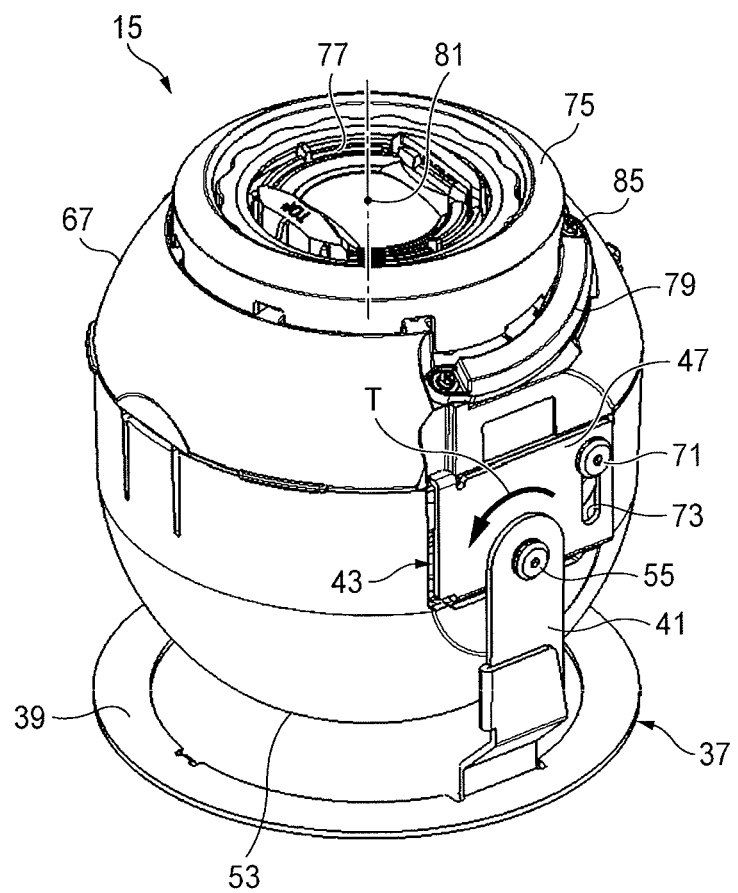
FIG. 3 is an enlarged view of a camera Assy unit illustrated in FIG. 2.

FIG. 3 is an enlarged view of camera Assy unit 15 illustrated in FIG. 2.

Camera Assy unit 15 is supported at camera body Assy unit 17 via pan angle 37. Pan angle 37 includes a pair of pan rising arms 41 rising from both end sides of annular pan flange 39 in a diameter direction. Rotation of pan flange 39 is adjusted in a predetermined pan rotation direction with respect to camera body Assy unit 17, and then pan angle 37 is fixed to camera body Assy unit 17. Pan angle 37 rotatably supports tilt angle 43 in a tilt rotation direction via the pair of pan rising arms 41.

Figure 4:
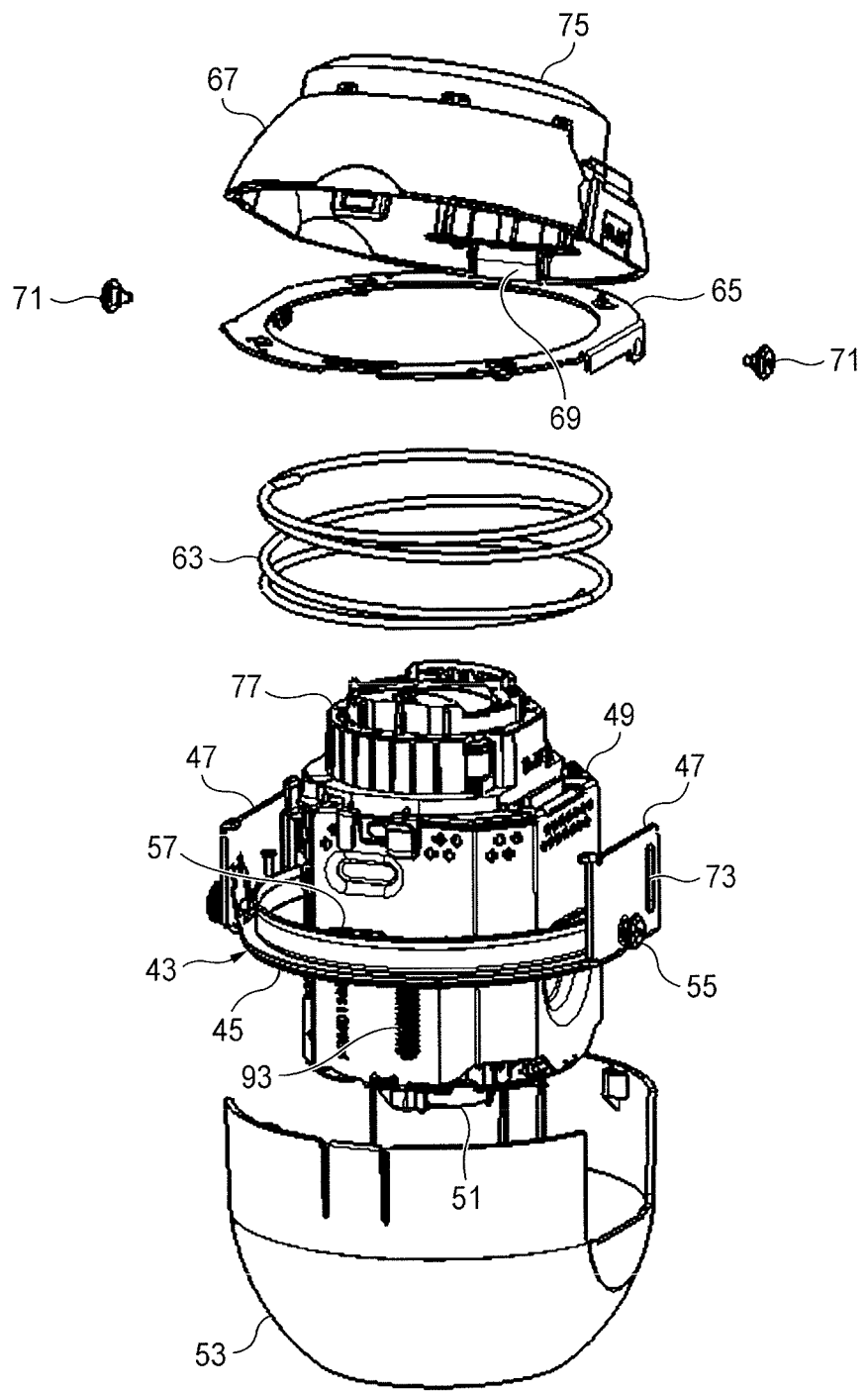
FIG. 4 is an exploded perspective view of the camera Assy unit illustrated in FIG. 3.

FIG. 4 is an exploded perspective view of camera Assy unit 15 illustrated in FIG. 3.

Tilt angle 43 includes tilt flange 45 and a pair of tilt side plates 47. Tilt flange 45 is formed in a ring shape (refer to FIG. 6). Lens module 49 is disposed inside tilt flange 45 so as to be separated therefrom. Fan motor 51 for adjusting the internal temperature is attached to a rear of lens module 49. The rear of lens module 49 is covered with lens module lower cover 53 of camera Assy unit 15. The pair of tilt side plates 47 rises from both ends of tilt flange 45 in the diameter direction.

As illustrated in FIG. 3, a tilt shaft (first fixation screw 55) penetrating through pan rising arms 41 is fixed to each of tilt side plates 47. Tilt angle 43 is supported at pan angle 37 centering on first fixation screw 55 in a free tilt rotation manner.

Yaw plate 57 is placed on tilt flange 45 of tilt angle 43. Yaw plate 57 is formed in a bottomed cylindrical shape, and rectangular lens module insertion hole 61 (refer to FIG. 6) is formed in bottom plate 59. Lens module 49 is disposed inside lens module insertion hole 61.

First coil spring 63 is placed on an upper surface of yaw plate 57. Lens module 49 is disposed inside first coil spring 63. First coil spring 63 supports annular LED mount plate 65 on an upper part thereof. LED mount 67 is provided on an upper surface of LED mount plate 65. LED mount 67 is attached to LED mount plate 65 via hinge 69, and is attached thereto in a rockable manner by being rotated centering on hinge 69.

Second fixation screw 71 is screwed into both ends of LED mount plate 65 in the diameter direction. Second fixation screw 71 is inserted into a vertically long hole 73 formed in tilt side plates 47 and is then screwed into LED mount plate 65. Second fixation screw 71 is fixed to LED mount plate 65 via long hole 73 in a state in which first coil spring 63 is compressed. LED mount plate 65 pinches first coil spring 63 along with yaw plate 57 from the vertical direction, and is thus attached to tilt angle 43. In other words, second fixation screw 71 functions as a stopper of LED mount plate 65 biased by first coil spring 63.

As mentioned above, in dome camera 11, tilt angle 43 is formed in a ring shape surrounding lens module 49. First coil spring 63 is disposed between LED mount 67 and tilt angle 43 and surrounds lens module 49 so as to bias LED mount 67 in a direction of being close to dome cover 19. Therefore, LED mount 67 is supported at tilt angle 43 so as to sink in a direction of being separated from dome cover 19 of dome Assy unit 13.

LED mount 67 is formed in a bowl shape in which a lower side thereof is a large-diameter side opening. An annular light shielding cover is attached to an upper side of LED mount 67. The light shielding cover may be made of, for example, a rubber material. The rubber material is preferably highly soft and flexible so as to be easily deformed by a pressing force from contact with dome cover 19. The rubber material preferably has heat resistance, cold resistance, and weatherability in consideration of outdoor installation environments of dome camera 11.

Examples of such a rubber material may include ethylene-propylene rubber (EPDM), chloroprene rubber (CR), butyl rubber (IIR), silicone rubber (Si), and thermoplastic elastomer. Hereinafter, light shielding rubber 75 will be exemplified as the light shielding cover.

Light shielding rubber 75 surrounds front unit 77 of lens module 49 and comes into close contact with the inner surface of dome cover 19. Light shielding rubber 75 is disposed higher than front unit 77 of lens module 49. In other words, light shielding rubber 75 protrudes further upward than front unit 77 of lens module 49.

Figure 5:
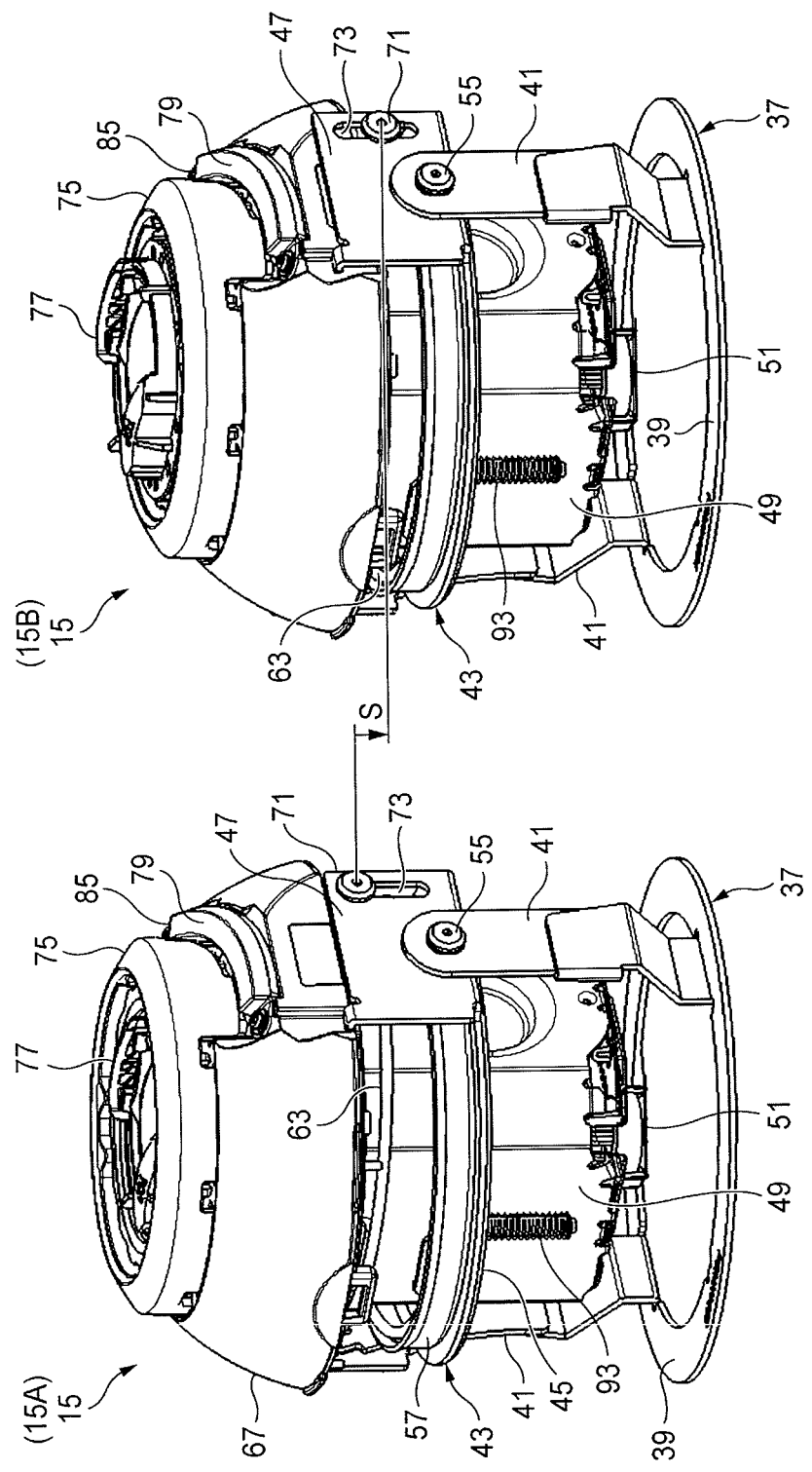
FIG. 5 is a perspective view illustrating the camera Assy unit before an LED mount sinks and the camera Assy unit after the LED mount sinks.

FIG. 5 is a perspective view illustrating camera Assy unit 15 (15A) before LED mount 67 sinks and camera Assy unit 15 (15B) after LED mount 67 sinks.

In camera Assy unit 15A, LED mount 67 is biased to first coil spring 63 so that second fixation screw 71 comes into contact with the upper end of long hole 73, and is thus disposed so as to be biased to dome cover 19 side (the upper side of FIG. 5)

In camera Assy unit 15B, if light shielding rubber 75 of LED mount 67 is pressed, first coil spring 63 is compressed so that second fixation screw 71 is slid along long hole 73 downwards, and thus LED mount 67 sinks by distance S. Light shielding rubber 75 is pressed when dome cover 19 is attached to camera body Assy unit 17. Therefore, light shielding rubber 75 comes into close contact with the inner surface of dome cover 19.

LED mount 67 is provided with LED units 79 for night vision illumination on an outer circumference thereof outside light shielding rubber 75. Each of LED units 79 includes, for example, an LED board (not illustrated) formed in an arc shape and in which light sources are arranged in a longitudinal direction. The light sources apply infrared light. In the present exemplary embodiment, a pair of LED units 79 are disposed on LED mount 67 so as to be disposed in one semicircle on an opposite side to a tilt rotation direction (arrow T direction in FIG. 3) in a circumference centering on lens center axis 81. The pair of LED units 79 are disposed so as to be, for example, linearly symmetrical to each other with respect to virtual line 83 (refer to FIG. 13) which is perpendicular to lens center axis 81 and equally divides one semicircle into two parts. The number of LED units 79 is not limited to two and may be three or more.

Camera Assy unit 15 may not be tilt-rotated in an opposite direction to the arrow T direction from the standing posture illustrated in FIG. 3. Imaging in the opposite direction to the arrow T direction may be performed through 180° rotation of pan angle 37.

The pair of LED units 79 are provided on LED mount 67 in such a way as to be inclined with respect to a virtual plane perpendicular to lens center axis 81 so that a subject is included in a light distribution region. In other words, the pair of arc-shaped LED units 79 are inclined so that each of proximal ends 85 (adjacent ends between which a distance is short in a circumferential direction) in an extending direction thereof is located further toward front unit 77 side than the other end in the extending direction. Consequently, even if LED units 79 are disposed in one semicircle, the light distribution region of night vision illumination light includes a subject (that is, the subject is irradiated with the night vision illumination light).

Figure 6:
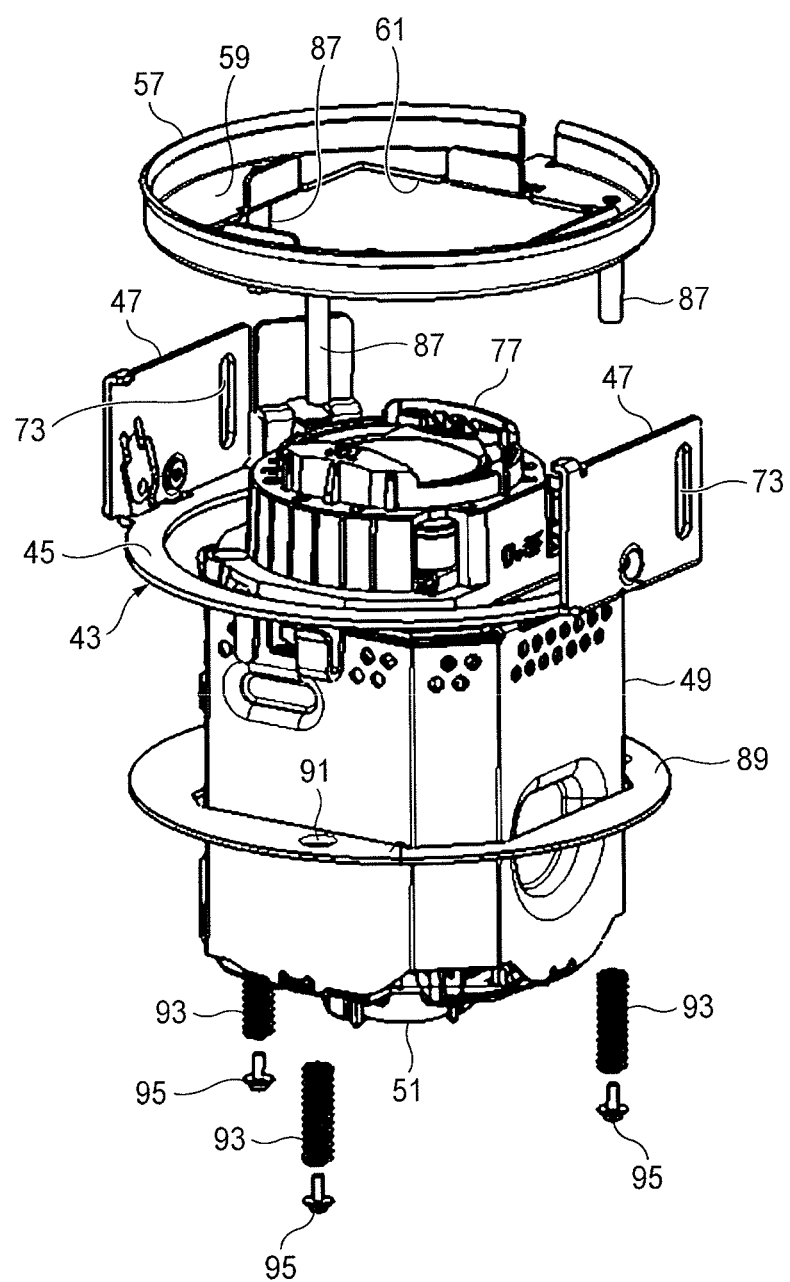
FIG. 6 is an exploded perspective view of a lens module, a tilt angle, and a yaw plate.

FIG. 6 is an exploded perspective view of lens module 49, tilt angle 43, and yaw plate 57.

Yaw plate 57 has a plurality of (three in the illustrated example) yaw plate shafts 87 vertically provided in the circumferential direction of bottom plate 59 at the same intervals. Yaw plate 57 may be integrally formed with yaw plate shafts 87. Each of yaw plate shafts 87 penetrates through a gap between tilt flange 45 and lens module 49. Annular lens module plate 89 is integrally fixed to the outer circumference of lens module 49 via a screw or the like. Shaft penetration hole 91 through which yaw plate shaft 87 penetrates is provided in lens module plate 89.

Yaw plate shaft 87 penetrates through shaft penetration hole 91 of lens module plate 89. Second coil spring 93 is externally inserted into each yaw plate shaft 87 penetrating through shaft penetration hole 91. Second coil spring 93 is prevented from being released from yaw plate shaft 87 via third fixation screw 95 screwed into a lower end of yaw plate shaft 87. An upper end of second coil spring 93 comes into contact with lens module plate 89, and a lower end thereof comes into contact with third fixation screw 95 so that second coil spring 93 is held in a compressed state.

As mentioned above, yaw plate 57 is placed on tilt angle 43 so as to be integrated therewith. In other words, it can be said that yaw plate shaft 87 is supported at tilt angle 43. Second coil spring 93 which is externally inserted into yaw plate shaft 87 pushes lens module plate 89 upward (arrow B direction in FIG. 7) due to an elastic restoring force. Consequently, lens module 49 is held in a state in which lens module plate 89 is biased to tilt flange 45 of tilt angle 43 from the lower direction. Thus, lens module 49 can perform yaw rotation together with yaw plate 57 and lens module plate 89. Lens module plate 89 is in a state of being placed on the upper end of second coil spring 93.

As described above, tilt angle 43 is supported at pan angle 37 in a free tilt rotation manner. Lens module 49 is supported at tilt angle 43 in a free yaw rotation manner.

Figure 7:
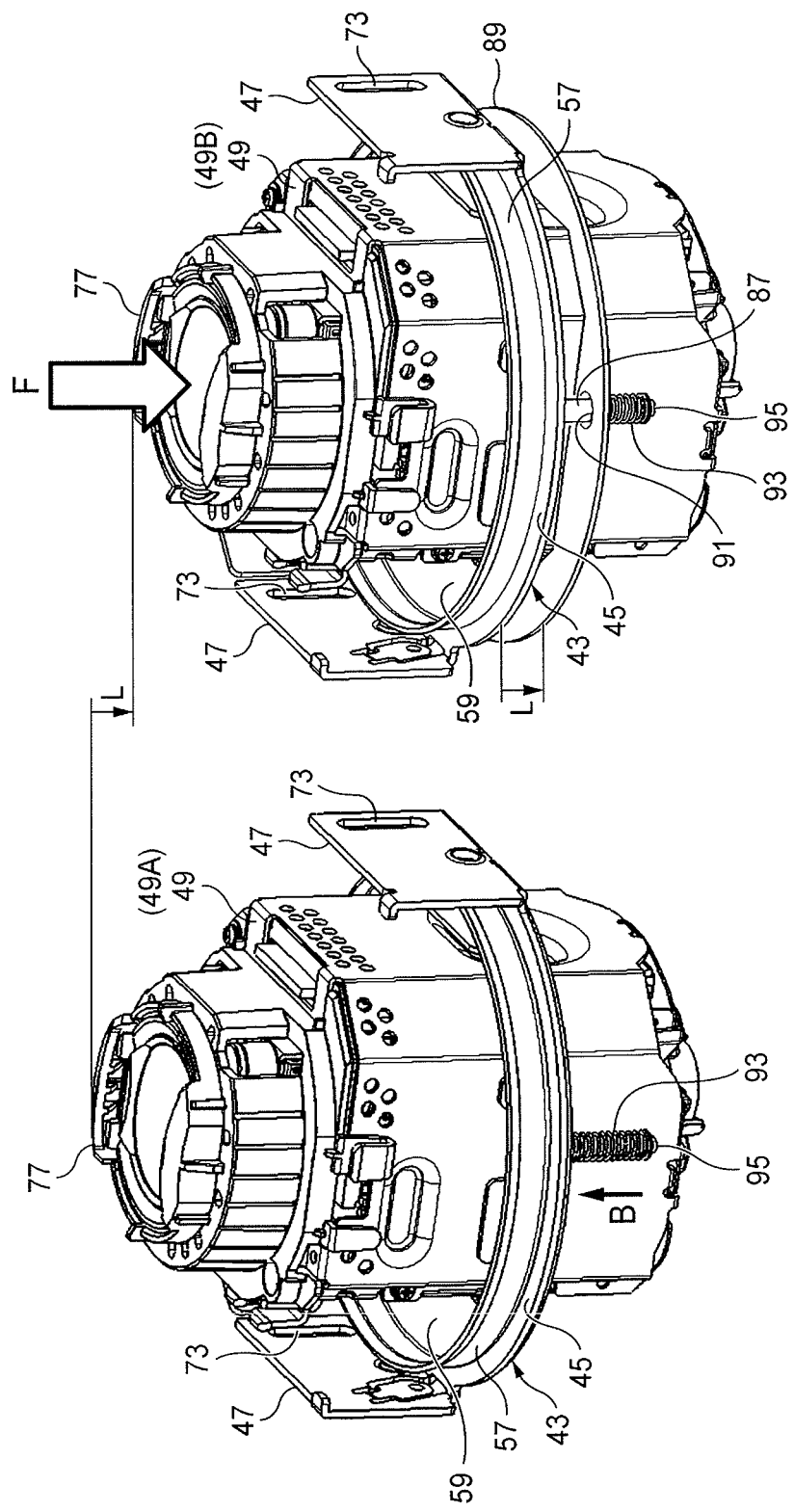
FIG. 7 is a perspective view illustrating a lens module before sinking and the lens module after sinking.

FIG. 7 is a perspective view illustrating lens module 49 (49A) before sinking and lens module 49 (49B) after sinking.

In a case where dome cover 19 is deformed due to an external force, force F in a pressing direction may be applied to front unit 77 in lens module 49. In lens module 49A in a normal state, lens module plate 89 is placed on the upper end of second coil spring 93 and is thus held in a state of coming into contact with tilt flange 45 from the lower side.

Downward force F is applied to front unit 77 in lens module 49B. In this case, lens module 49B compresses second coil spring 93 via lens module plate 89 and thus sinks downward by distance L. Consequently, lens module 49 can absorb an impact force or the like in a case where dome cover 19 is hit.

As mentioned above, in dome camera 11, lens module 49 is attached to tilt angle 43 so as to sink in a direction of being separated from dome cover 19. In other words, in dome camera 11, LED mount 67 and lens module 49 individually have a sinking function.

If an impact or the like is applied to dome cover 19, dome cover 19 may be deformed. As impact resistant means against deformation of dome cover 19, a sinking mechanism is provided in camera Assy unit 15. LED unit 79 for night vision illumination may be provided in dome camera 11, and light shielding rubber 75 is provided in order to prevent night vision illumination light from being projected in the lens. Generally, a light shielding rubber is pressed to dome cover 19 so as to block night vision illumination light, and thus the light shielding rubber is typically provided around the lens and structurally sinks along with the lens. In this case, there is a possibility of the occurrence of a deviation in an angle of view.

In contrast, in dome camera 11 of the present exemplary embodiment, in a case where stress is applied to light shielding rubber 75, first coil spring 63 is compressed, and thus LED mount 67 sinks. As mentioned above, in dome camera 11, the sinking mechanism provided with light shielding rubber 75 is provided separately from the sinking mechanism of lens module 49. Therefore, in dome camera 11, stress applied to light shielding rubber 75 during covering of dome cover 19 after an angle of view is adjusted in installation work can be prevented from being influenced to the position of lens module 49. As a result, in dome camera 11, it is possible to reduce a possibility that a deviation in an angle of view may occur due to the installation work.

Figure 8:
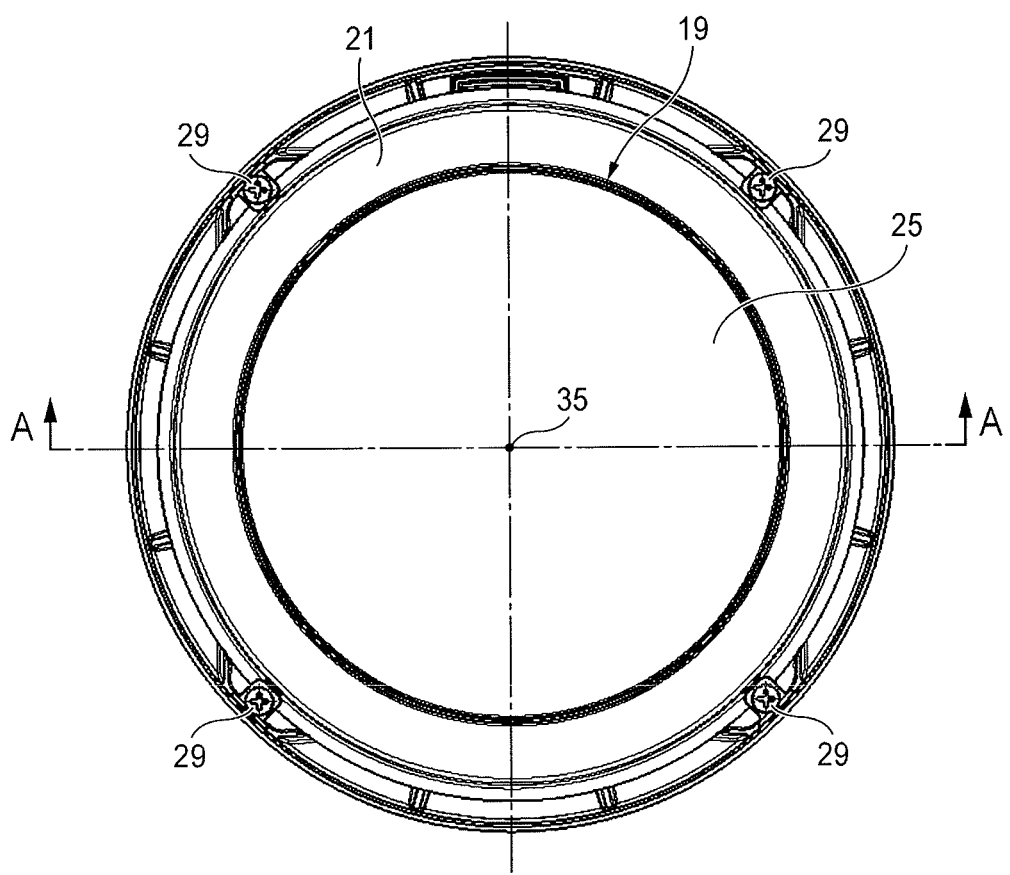
FIG. 8 is a plan view of the imaging apparatus illustrated in FIG. 1.

FIG. 8 is a plan view of dome camera 11 illustrated in FIG. 1.

In dome camera 11 viewed from the top, dome cover 19 is fixed to camera body Assy unit 17 by dome cover presser 21 via four fixation screws 29. Exteriors of dome cover 19, dome cover presser 21, and camera body Assy unit 17 are formed in concentric shapes. The center of the concentric shapes matches pan rotation central axis 35.

Figure 9:
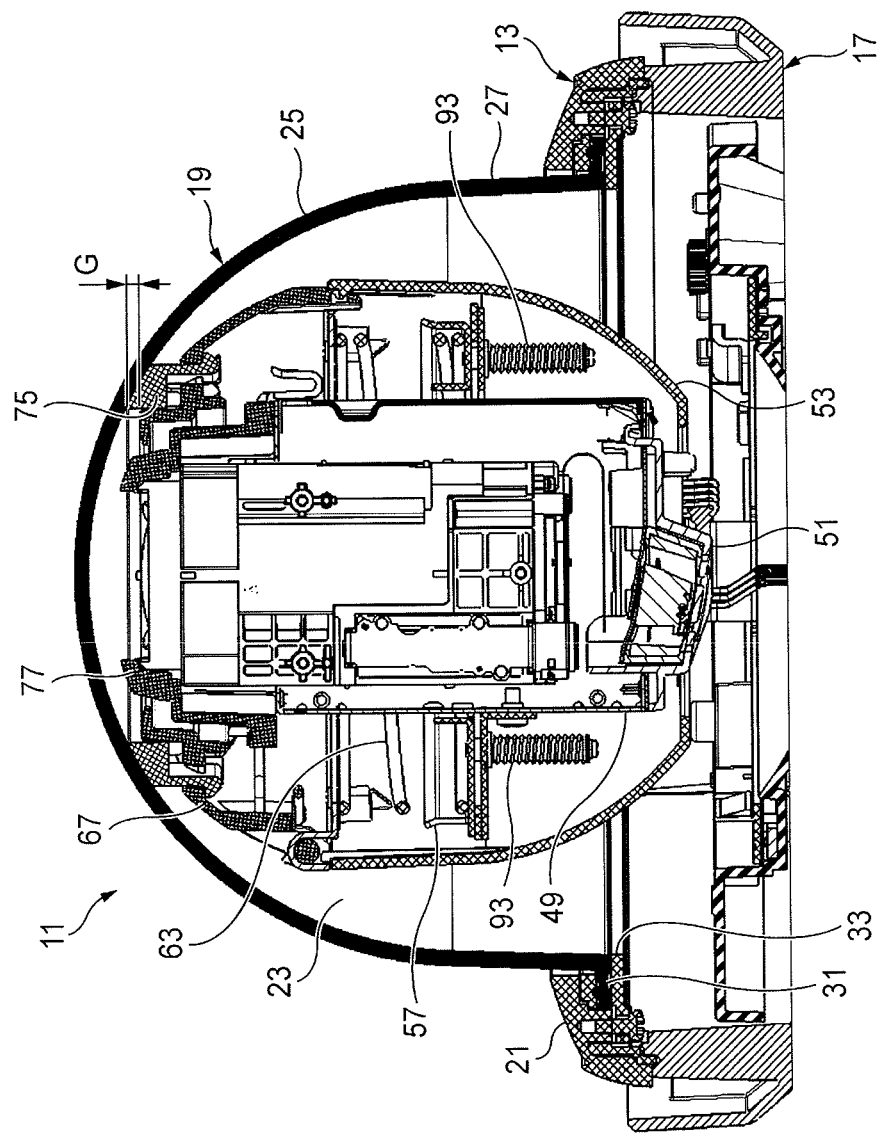
FIG. 9 is a sectional view taken along the line IX-IX in FIG. 8 when a tilting angle of the lens module is 0°.
Figure 10:
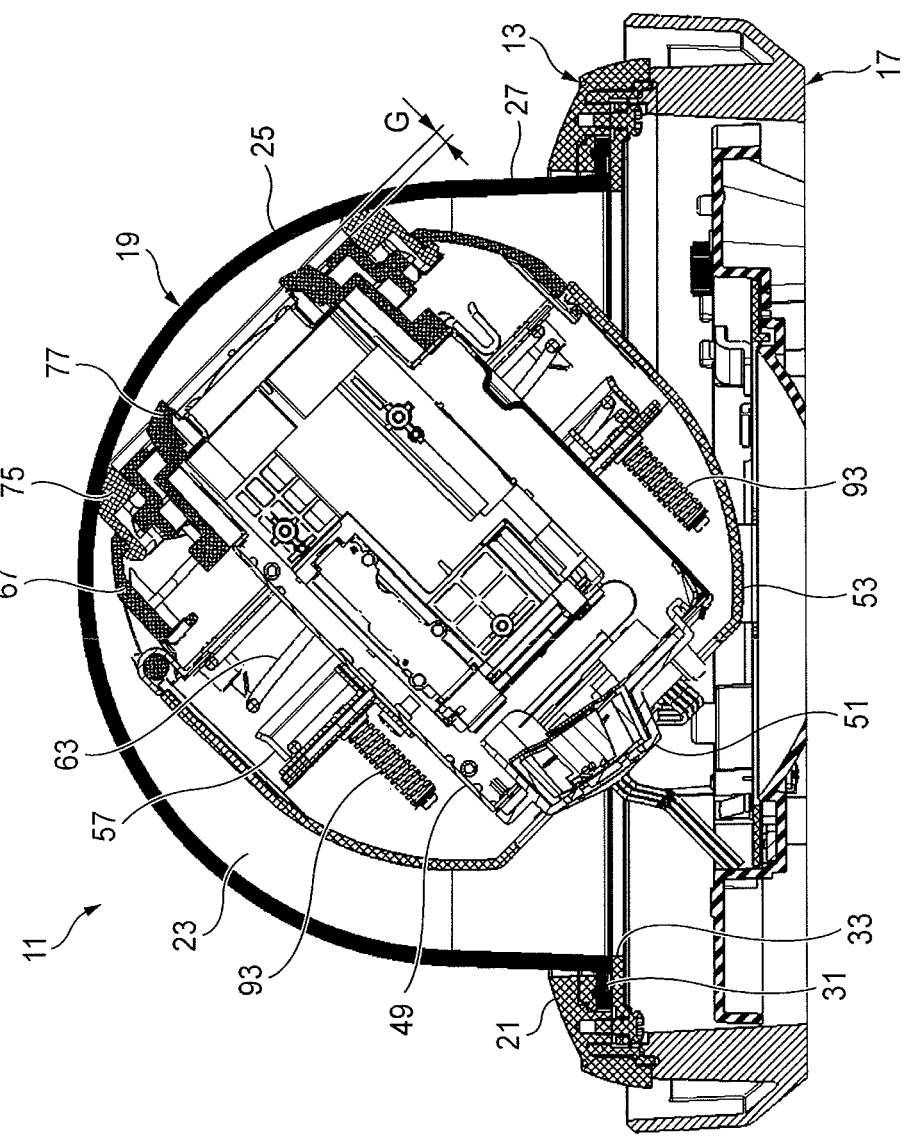
FIG. 10 is a sectional view taken along the line X-X in FIG. 8 when a tilting angle of the lens module is 45°.
Figure 11:
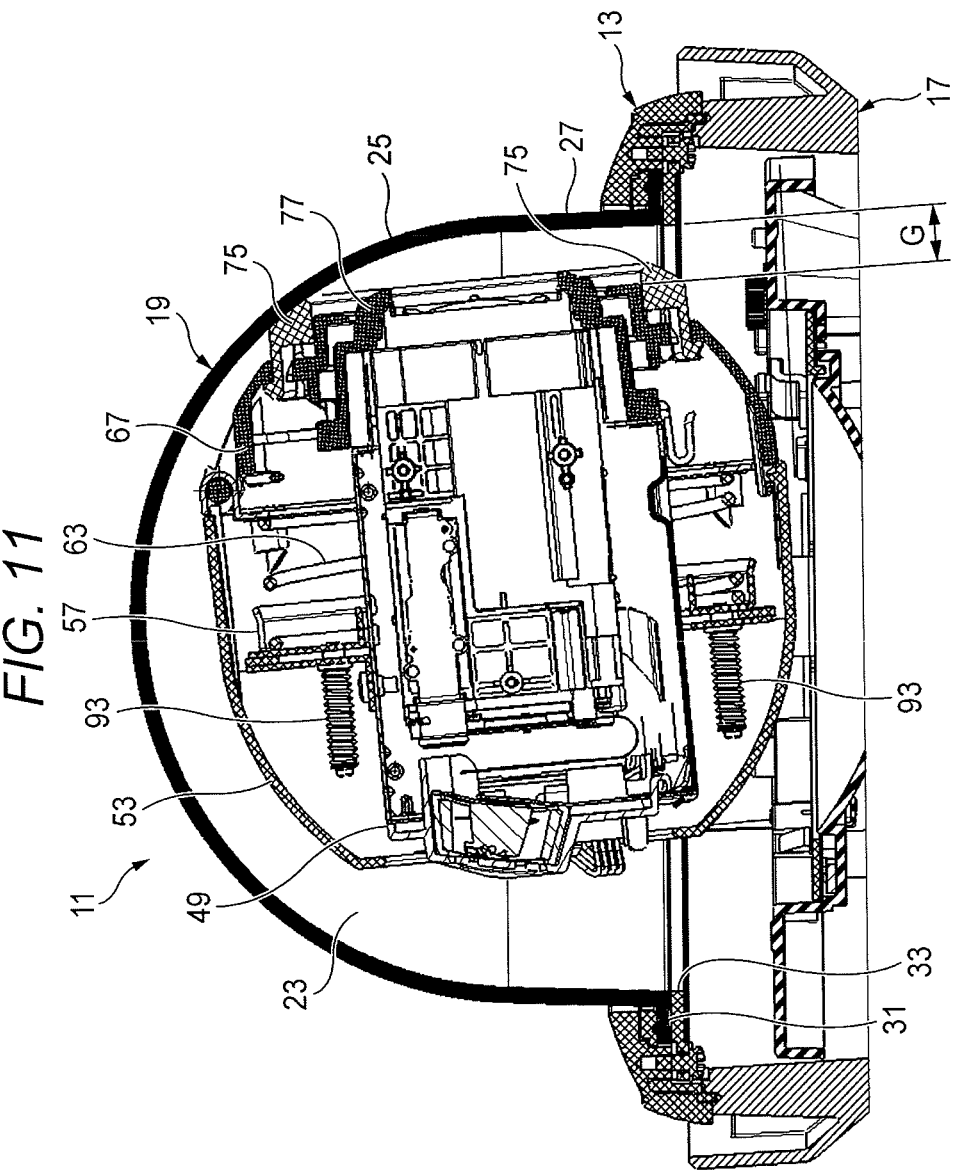
FIG. 11 is a sectional view taken along the line XI-XI in FIG. 8 when a tilting angle of the lens module is 85°.

FIG. 9 is a sectional view taken along the line IX-IX in FIG. 8 when a tilting angle of lens module 49 is 0°. FIG. 10 is a sectional view taken along the line X-X in FIG. 8 when a tilting angle of lens module 49 is 45°. FIG. 11 is a sectional view taken along the line XI-XI in FIG. 8 when a tilting angle of lens module 49 is 85°.

As illustrated in FIG. 9, in dome camera 11, gap G between the inner surface of dome camera 11 and the lens is shielded by light shielding rubber 75 at a tilting angle of 0°, and thus there is no influence of projection of night vision illumination light.

As illustrated in FIG. 10, in dome camera 11, gap G is shielded by light shielding rubber 75 at a tilting angle of 45° in the same manner as at a tilting angle of 0°. Also in cases other than a tilting angle of 45°, if light shielding rubber 75 does not reach straight portion 27 of dome cover 19, there is no change in an influence of projection of night vision illumination light in the same manner as at a tilting angle of 0°.

As illustrated in FIG. 11, in dome camera 11, light shielding rubber 75 reaches straight portion 27, for example, at a tilting angle of 85°. In this case, gap G increases, and thus there is an increase in a possibility of an influence of projection of night vision illumination light. The increase in an influence of projection of night vision illumination light can be reduced with a configuration according to a second exemplary embodiment which will be described later.

Next, a description will be made of operations of the above-described configuration.

In dome camera 11 according to the present exemplary embodiment, camera body Assy unit 17 is attached to, for example, a ceiling, a wall, or a support pole of a monitoring camera. Camera body Assy unit 17 supports lens module 49 via pan angle 37, tilt angle 43, and yaw plate 57. In lens module 49, rotation thereof in a pan rotation direction is adjusted through rotation of pan angle 37, rotation thereof in a tilt rotation direction is adjusted through rotation of tilt angle 43, and rotation thereof in a yaw rotation direction is adjusted through rotation of yaw plate 57. After the adjustment is performed, pan angle 37 is fixed to camera body Assy unit 17 so as not to be rotated. After the adjustment is performed, tilt angle 43 is fixed to pan angle 37 so as not to be rotated. After the adjustment is performed, yaw plate 57 is fixed to tilt angle 43 so as not to be rotated. Consequently, lens module 49 is fixed to a certain location so that the lens is directed in a target imaging direction.

Next, dome cover 19 is attached to camera body Assy unit 17. When attached to camera body Assy unit 17, dome cover 19 comes into contact with the inner surface of light shielding rubber 75. Light shielding rubber 75 is provided on LED mount 67. LED mount 67 sinks in a direction of being separated from dome cover 19 when light shielding rubber 75 is pressed by dome cover 19. In other words, light shielding rubber 75 can be pushed down in a state of coming into close contact with the inner surface of dome cover 19. In this case, lens module 49 is located to be separated from the inside of light shielding rubber 75, and thus does not come into contact with light shielding rubber 75.

Consequently, even if dome cover 19 is attached, lens module 49 does not come into contact with dome cover 19, and thus it is possible to reduce a deviation in an imaging direction or an angle of view. Therefore, even if a distant position is imaged, the imaging apparatus can capture an image including a desired subject by reducing a deviation in an angle of view.

Light shielding rubber 75 surrounds and covers front unit 77 of lens module 49, and comes into close contact with the inner surface of dome cover 19. In other words, gap G between light shielding rubber 75 and the inner surface of dome cover 19 is narrow, and gap G is shielded by light shielding rubber 75. As a result, light shielding rubber 75 can block night vision illumination light which is emitted from LED unit 79 and is incident to lens module 49 after being reflected from the inner surface of dome cover 19.

In dome camera 11, if an external force causing dome cover 19 to be deformed inward is applied thereto during operation of dome camera 11, LED mount 67 is pushed inward (sinks) via light shielding rubber 75. In lens module 49, if an amount of deformed dome cover 19 is more than a separation distance between the inner surface of dome cover 19 and lens module 49, front unit 77 comes into contact with the inner surface of dome cover 19. If front unit 77 comes into contact with the inner surface of dome cover 19 and is thus pressed thereby, lens module 49 sinks with respect to tilt angle 43. Consequently, an impact applied to lens module 49 from the outside is reduced. In other words, lens module 49 has impact resistance (vandal-resistant).

In dome camera 11, tilt angle 43 is formed in a ring shape. Both ends of ring-shaped tilt angle 43 in the diameter direction are supported at pan angle 37 by the tilt shaft in a free tilt rotation manner. The lower end of first coil spring 63 is placed on the upper surface of yaw plate 57 provided on the upper part of tilt angle 43. First coil spring 63 supports LED mount 67 at the upper end thereof. First coil spring 63 is disposed between yaw plate 57 and LED mount 67 in a compression state. A predetermined or more separation between yaw plate 57 and LED mount 67 is restricted by the stopper. Consequently, LED mount 67 is biased in a direction of being close to dome cover 19. If light shielding rubber 75 is pushed down, first coil spring 63 is compressed, and thus LED mount 67 can sink.

In dome camera 11, first coil spring 63 biasing LED mount 67 is disposed on the outer circumference of lens module 49 so as to surround first coil spring 63, and thus a space is saved and becomes compact due to a small number of components and efficient arrangement of the components.

Therefore, according to dome camera 11 of the first exemplary embodiment, it is possible to minimize a deviation in an angle of view when the camera is assembled.

Second Exemplary Embodiment

Figure 12:
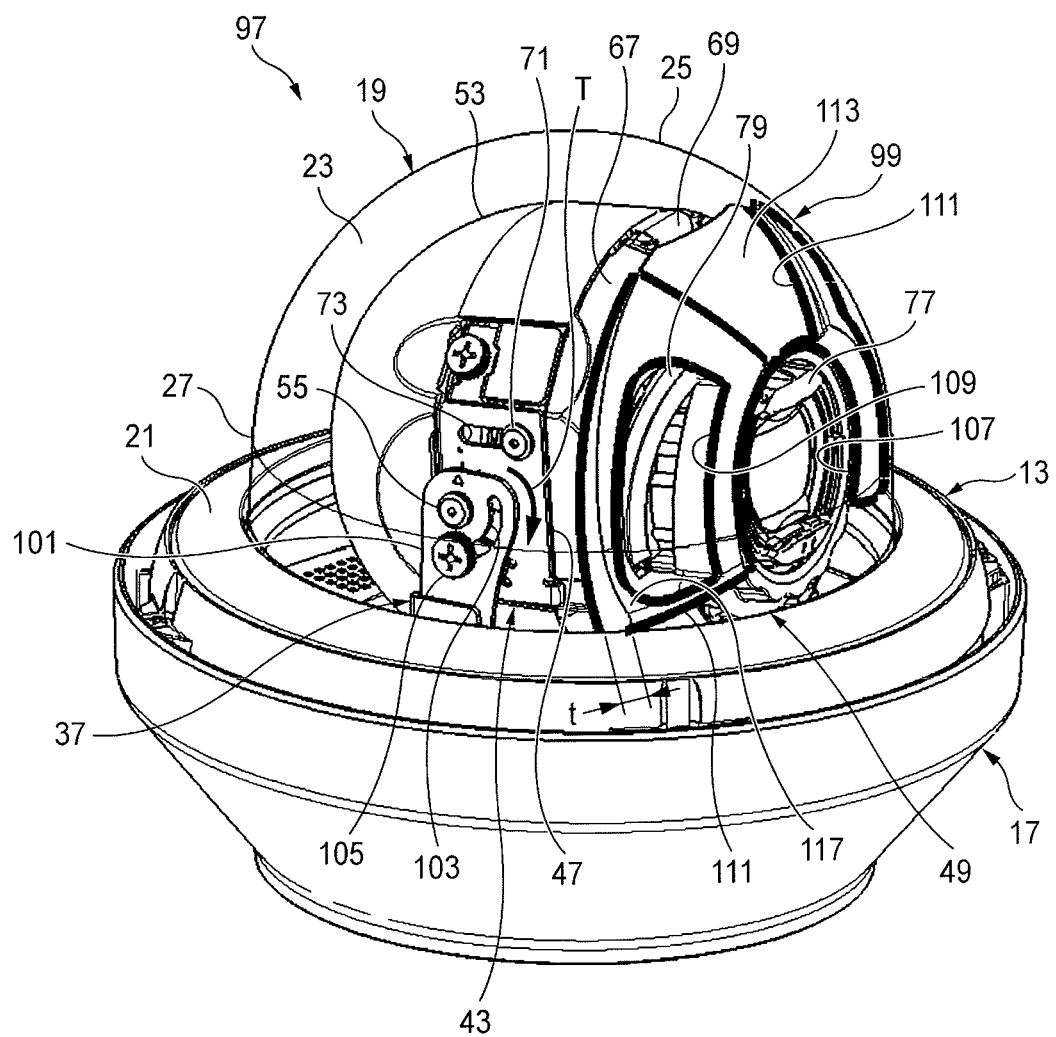
FIG. 12 is a perspective view illustrating that a tilting angle of a lens module of an imaging apparatus according to a second exemplary embodiment is 85°.
Figure 13:
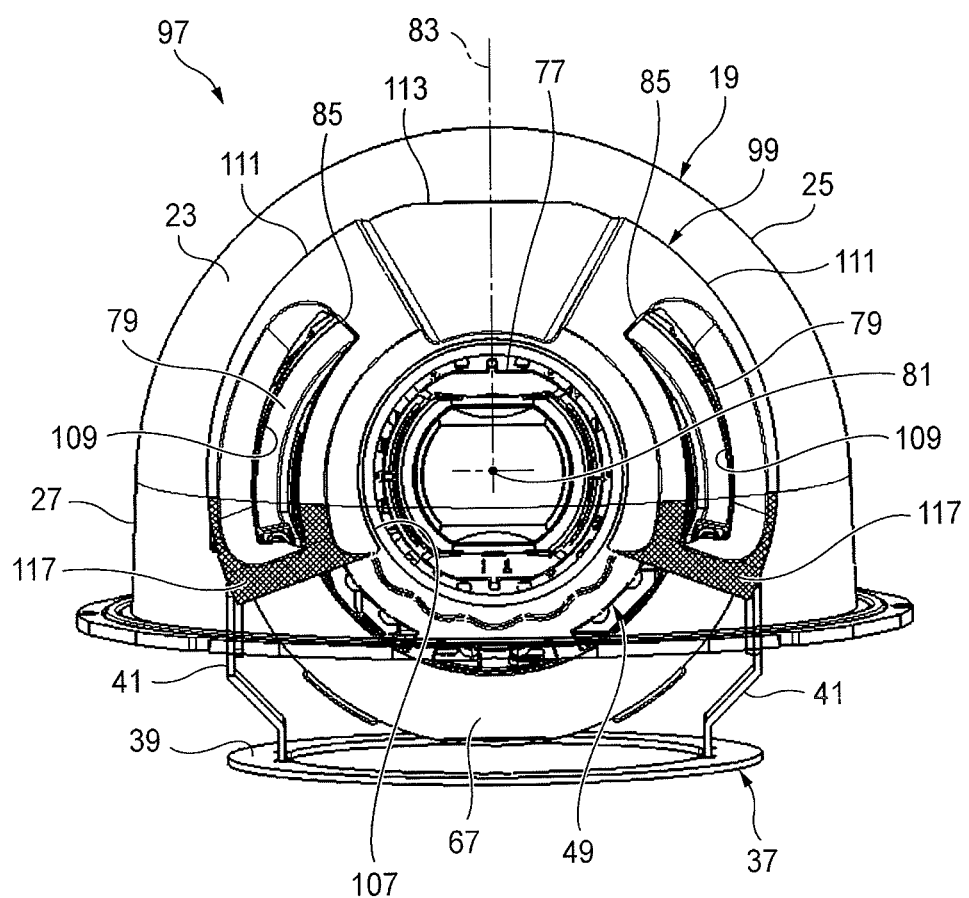
FIG. 13 is a perspective view in which the imaging apparatus illustrated in FIG. 12 is viewed from the front side of the lens module.

FIG. 12 is a perspective view illustrating that a tilting angle of lens module 49 of dome camera 97 according to a second exemplary embodiment is 85°. FIG. 13 is a perspective view in which dome camera 97 illustrated in FIG. 12 is viewed from front unit 77 side of lens module 49. In a configuration of the second exemplary embodiment, the same members as the members illustrated in FIGS. 1 to 11 are given the same reference numerals, and description thereof will be omitted or made briefly.

Dome camera 97 according to the second exemplary embodiment is different from dome camera 11 according to the first exemplary embodiment in terms of light shielding rubber 99, and other configurations are the same as each other.

Dome camera 97 includes dome cover 19 inside which lens module housing space 23 is formed and in which cylindrical straight portion 27 is continuously formed at an opening edge of hemispherical portion 25, and camera body Assy unit 17 attached with dome cover 19. Dome camera 97 includes pan angle 37 supported at camera body Assy unit 17 inside dome cover 19, and tilt angle 43 which is fixed to pan angle 37 and supports lens module 49. Dome camera 97 includes LED mount 67 supported at tilt angle 43 and provided with LED units 79 for night vision illumination, and light shielding rubber 99 provided on LED mount 67, surrounding LED units 79, and coming into close contact with an inner surface of dome cover 19.

In dome camera 97, curved groove 103 is formed in pan rising arm 101 of pan angle 37. Tilt rotation fixing screw 105 is inserted into curved groove 103. Tilt rotation fixing screw 105 inserted into curved groove 103 is screwed into tilt side plate 47. In other words, curved groove 103 functions as a guide groove of tilt rotation fixing screw 105. When tilt rotation fixing screw 105 is fixed to a predetermined position of curved groove 103, tilt angle 43 (that is, lens module 49) is fixed to pan rising arm 101 with a predetermined tilting angle.

Dome camera 97 is provided with LED units 79 for night vision illumination on an outer circumference of LED mount 67 outside front unit 77 of lens module 49. In dome camera 97, LED units 79 are disposed on LED mount 67 so as to be disposed in one semicircle on an opposite side to a tilt rotation direction in a circumference centering on lens center axis 81 (refer to FIG. 13). Each of LED units 79 includes, for example, an LED board (not illustrated) which is formed in an arc shape and in which light sources are arranged in a longitudinal direction inside LED unit 79. The light sources apply infrared light. LED units 79 are provided on LED mount 67 so as to be disposed in one semicircle on an opposite side to a tilt rotation direction (arrow T direction in FIG. 12) in a circumference centering on lens center axis 81. As illustrated in FIG. 13, the pair of LED units 79 are disposed so as to be, for example, linearly symmetrical to each other with respect to virtual line 83 which is perpendicular to lens center axis 81 and equally divides one semicircle into two parts. The number of LED units 79 is not limited to two and may be three or more.

LED units 79 are provided on LED mount 67 in such a way of being inclined with respect to a virtual plane perpendicular to lens center axis 81 so that a subject is included in a light distribution region. In other words, the pair of arc-shaped LED units 79 are inclined so that each of proximal ends 85 (adjacent ends between which a distance is short in a circumferential direction) in an extending direction thereof is located further toward front unit 77 side than the other end in the extending direction. Consequently, even if LED units 79 are disposed in one semicircle, the light distribution region of night vision illumination light includes a subject (that is, the subject is irradiated with the night vision illumination light).

Light shielding rubber 99 is made of the same material as that of light shielding rubber 75 according to the first exemplary embodiment. Light shielding rubber 99 may have, for example, a substantially semicircular shape formed by using a truncated cone shape, or other shapes. Lens module exposure hole 107 which exposes front unit 77 of lens module 49 is formed at the center of light shielding rubber 99. The large-diameter side of light shielding rubber 99 on an opposite side to the lens module exposure hole 107 is adhered to LED mount 67. A pair of LED exposure holes 109 corresponding to LED units 79 are formed around lens module exposure hole 107. LED exposure holes 109 respectively surround LED units 79.

In light shielding rubber 99, a pair of fans 111 in which left and right LED exposure holes 109 are disposed are formed thick so as to be heightened toward dome cover 19. In other words, connection 113 connecting the pair of fans 111 to each other is thin. Consequently, fans 111 easily come into close contact with the inner surface of dome cover 19.

Light shielding rubber 99 is formed thick so that thickness t on a diameter side (the lower end sides of fans 111 illustrated in FIG. 12) of one semicircle increases toward dome cover 19. Consequently, the lower ends of fans 111 easily come into close contact with an inner surface of straight portion 27 in dome cover 19.

In dome camera 97, camera Assy unit 15 may not be tilt-rotated by 180° in an opposite direction to the arrow T direction from the posture illustrated in FIG. 12. Imaging in the opposite direction to the arrow T direction may be performed through 180° rotation of pan angle 37.

Next, a description will be made of operations of dome camera 97 according to the second exemplary embodiment.

In dome camera 97, tilt angle 43 supports lens module 49. Tilt angle 43 also supports LED mount 67. LED mount 67 may be provided with LED units 79 for night vision illumination. LED units 79 are surrounded by light shielding rubber 99 provided on LED mount 67. Light shielding rubber 99 includes fans 111, connection 113, lens module exposure hole 107, LED exposure holes 109, and the like.

When dome cover 19 is attached, in light shielding rubber 99, a circumferential edge of an opening or the like housing LED units 79 comes into close contact with the inner surface of dome cover 19. In other words, gap G between light shielding rubber 99 and dome cover 19 is shielded by light shielding rubber 99. As a result, light shielding rubber 99 can more effectively block night vision illumination light which is emitted from LED unit 79 and is incident to front unit 77 (light collector) of lens module 49 after being reflected from the inner surface of dome cover 19.

FIG. 14A is a perspective view in which the imaging apparatus attached with large-diameter light shielding cover 115 is viewed from front unit 77 side of lens module 49. FIG. 14B is a perspective view in which dome camera 97 attached with light shielding rubber 99 according to the second exemplary embodiment is viewed from front unit 77 side of lens module 49.

Light shielding rubber 99 surrounds LED units 79 instead of surrounding front unit 77 of lens module 49. In a case of a structure in which light shielding rubber 99 surrounds front unit 77 of lens module 49, as illustrated in FIG. 14A, large-diameter light shielding cover 115 whose diameter is greater than an outer diameter of front unit 77 of lens module 49 is necessary. In a case where front unit 77 of lens module 49 is surrounded by large-diameter light shielding cover 115, if a tilting angle increases, a part (a front end in a tilt rotation direction) of large-diameter light shielding cover 115 reaches and overlaps straight portion 27 of dome cover 19 (refer to a shaded portion in FIG. 14A). Then, gap G between large-diameter light shielding cover 115 and the inner surface of straight portion 27 increases, and thus a space is generated between large-diameter light shielding cover 115 and dome cover 19. This is because the distance from the tilt rotation center to straight portion 27 is longer than the distance from the tilt rotation center to hemispherical portion 25. Thus, night vision illumination light reflected from gap G to the inner surface of dome cover 19 may enter lens module 49, and thus light from LED units 79 may be projected depending on situations.

In contrast, in dome camera 97, as illustrated in FIG. 14B, since LED units 79 as light sources are surrounded, overlapping (a shaded portion in FIG. 14B) with straight portion 27 can be made smaller than in large-diameter light shielding cover 115. In other words, whereas light is blocked by covering a light receiving side (lens side) in large-diameter light shielding cover 115, light is blocked by covering a light emitting side (LED unit 79 side) in dome camera 97. Therefore, in a case of light shielding rubber 99 of dome camera 97, diffusion of light on the light emitting side can be reduced, and thus night vision illumination light reflected from dome cover 19 can be prevented from reaching the lens. A range of gap G occurring when light shielding rubber 99 overlaps straight portion 27 is reduced. Consequently, it becomes easier for light shielding rubber 99 to block night vision illumination light which is reflected from the inner surface of dome cover 19 and then enters lens module 49. As a result, dome camera 97 is attached with light shielding rubber 99 and thus reliably has high light shielding property.

In dome camera 97, if tilt angle 43 is considerably rotated (for example, at a tilting angle of about 85°) in a tilt rotation direction, lens center axis 81 of lens module 49 passes through the vicinity of straight portion 27 of dome cover 19. Thus, the front end of LED mount 67 in the tilt rotation direction is moved further toward camera body Assy unit 17 side than straight portion 27. In other words, an opposite side of LED mount 67 to the tilt rotation direction is disposed in hemispherical portion 25 of dome cover 19. In other words, even if a tilting angle increases, LED units 79 are disposed on hemispherical portion 25 side of dome cover 19. As a result, night vision illumination light from LED units 79 is prevented from being blocked by camera body Assy unit 17 or the like. Consequently, in dome camera 97, even in a case where a tilting angle is large, it is possible to minimize a reduction in irradiation efficiency of night vision illumination light.

Light shielding rubber 99 of dome camera 97 is formed thick so that thickness t on a diameter side (that is, the front end side in the tilt rotation direction) of one semicircle increases toward dome cover 19. As a result of forming thickness 117, if a tilting angle is small, thickness 117 comes into close contact with the inner surface of dome cover 19.

Even if a tilting angle is large, for example, even if a tilting angle is 85°, the degree in which thickness 117 comes into close contact with the inner surface of dome cover 19 is lowered, but the state is maintained in which thickness 117 comes into close contact with the inner surface of dome cover 19. Alternatively, in a case where a tilting angle is large, contact between thickness 117 and the inner surface of dome cover 19 is removed, but a thickness of thickness 117 or a distance between light shielding rubber 99 and dome cover 19 may be adjusted so that night vision illumination light leaking out of gap G is not projected in the lens even if the night vision illumination light is reflected from dome cover 19. Consequently, even in a case where a tilting angle is large, light shielding gap G can be reduced, and thus it is possible to more effectively minimize night vision illumination light which is reflected from the inner surface of dome cover 19 and enters lens module 49 through gap G. If light shielding rubber 99 has a thickness and a thinness, a portion which does not contribute to light shielding of night vision illumination light in light shielding rubber 99 can be thinned.

In dome camera 97, LED units 79 are provided on LED mount 67 so as to be disposed in one semicircle on an opposite side to a tilt rotation direction as describe abode. Therefore, LED units 79 are provided on LED mount 67 in such a way of being inclined with respect to a virtual plane perpendicular to lens center axis 81. Consequently, night vision illumination light from LED units 79 is inclined in a direction intersecting lens center axis 81. As a result, even if LED units 79 are disposed in one semicircle, the light distribution region of night vision illumination light includes a subject (that is, the subject is irradiated with the night vision illumination light). Therefore, it is possible to obtain a clear image even at a dark location.

Figure 15:
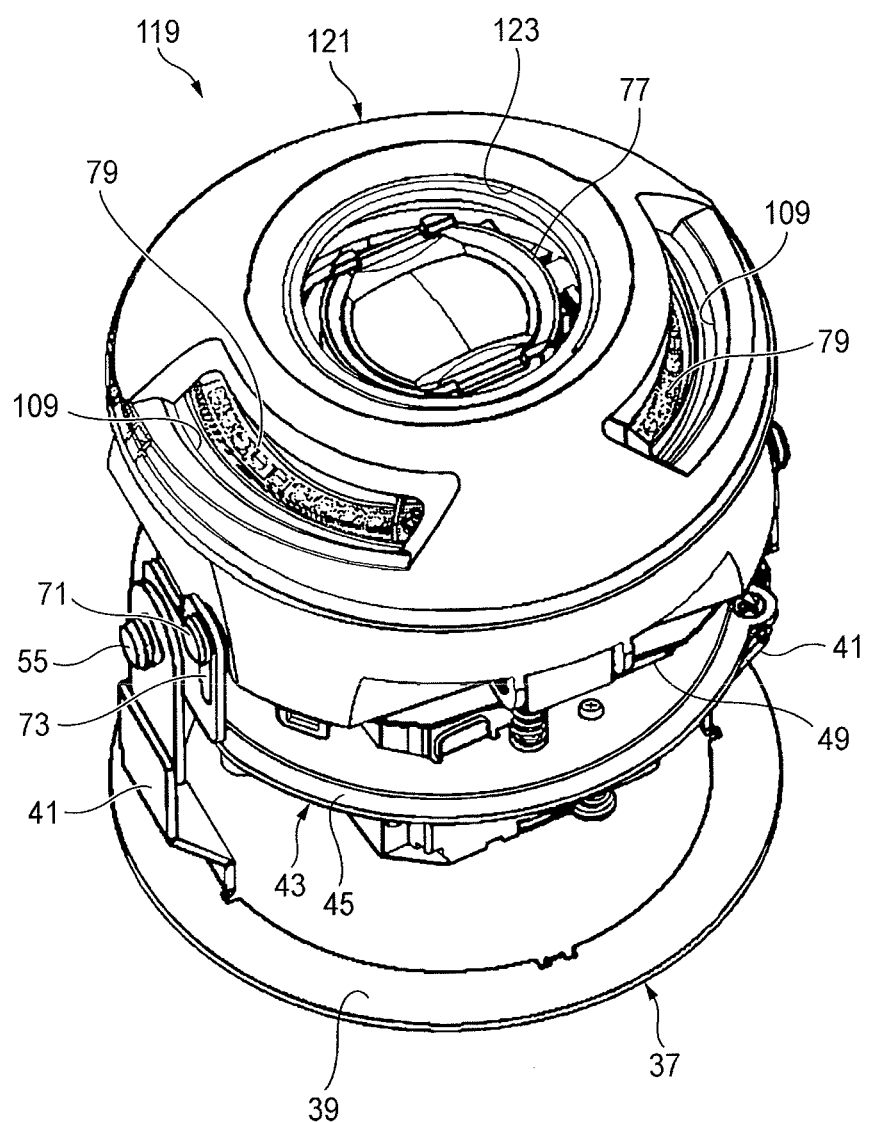
FIG. 15 is a perspective view illustrating an exterior of an imaging apparatus according to a modification example of the second exemplary embodiment.

FIG. 15 is a perspective view illustrating an exterior of dome camera 119 according to a modification example of the second exemplary embodiment.

In dome camera 119, light shielding rubber 121 is formed in a truncated cone shape. In other words, light shielding rubber 121 has a shape circling around the lens. Thus, lens module exposure hole 123 also has a circular shape. Other configurations are substantially the same as those of light shielding rubber 99.

In dome camera 119, light shielding rubber 121 has a circular shape (circling shape), and when compared with a case where a light shielding rubber has a semicircular shape, for example, if light shielding rubber 121 is black, a part of front unit 77 is hidden, and thus it is hard for a person to recognize a direction of the lens. When compared with a case of the semicircular shape, the circular shape is stabilized in terms of a shape, and thus the light shielding rubber can be easily installed on LED mount 67.

Therefore, according to dome camera 97 according to the second exemplary embodiment and dome camera 119 according to the modification example, it is possible to improve accuracy of minimizing projection of night vision illumination light.

Light shielding rubber 99 of dome camera 97 according to the second exemplary embodiment and light shielding rubber 121 according to the modification example of the second exemplary embodiment can be used in dome camera 11 according to the first exemplary embodiment. According to dome camera 11 in which light shielding rubber 99 or light shielding rubber 121 is used instead of light shielding rubber 75, it is possible to prevent a deviation in an angle of view during assembling of the camera, and to further improve accuracy of minimizing projection of night vision illumination light when the tilting angle is large.

The present invention is not limited to the configurations of the exemplary embodiments, and is applicable to any configurations as long as the configurations can realize the functions recited in the claims or the functions of the configurations of the exemplary embodiments.

As described above, the imaging apparatus of the exemplary embodiments includes lens module 49, dome cover 19, an apparatus main body, a first support member, a second support member, an illumination mount, and a light shielding cover. The inside of dome cover 19 is a housing space for housing lens module 49. The apparatus main body is provided with dome cover 19. The first support member is supported at the apparatus main body in dome cover 19 in a free pan rotation manner. The second support member is supported at the first support member in a free tilt rotation manner and supports lens module 49. The illumination mount is provided with an illumination member and is supported at the second support member. The light shielding cover is a ring-shaped light shielding cover which is provided on the illumination mount, surrounds the illumination member, and comes into contact with the inner surface of the dome cover.

The imaging apparatus is, for example, dome camera 97 or 119. The apparatus main body is, for example, camera body Assy unit 17. The first support member is, for example, pan angle 37. The second support member is, for example, tilt angle 43. The light shielding cover is, for example, light shielding rubber 99 or 121. The illumination mount is, for example, LED mount 67. The housing space is, for example, lens module housing space 23. The cylinder is, for example, straight portion 27. The illumination member is, for example, LED unit 79.

Consequently, illumination light (for example, night vision illumination light) can be blocked on the light emitting side (illumination member side) instead of the light receiving side (lens side). In a case where light is blocked on the light receiving side, the light may be diffused before reaching the light receiving side from the light emitting side, but, in a case where the light is blocked on the light emitting side, the light is diffused only in a gap between the illumination member and the light shielding cover. Therefore, it is possible to prevent light emitted from the illumination member from being reflected by the dome cover and being incident to the lens. Even if lens module 49 is tilt-rotated, a contact state between the light shielding cover and dome cover 19 can be easily maintained. Therefore, even in a case where lens module 49 is tilt-rotated, it is possible to improve accuracy of minimizing projection of illumination light.

In dome cover 19, a cylinder may be continuously formed at the opening edge of hemispherical portion 25.

Consequently, even in a case where lens module 49 is tilt-rotated and thus front unit 77 of lens module 49 changes from a state of facing hemispherical portion 25 to a state of facing the cylinder, a gap with the illumination member can be reduced by using the light shielding cover. Therefore, a contact state between the light shielding cover and dome cover 19 can be easily maintained, and thus it is possible to improve accuracy of minimizing projection of illumination light.

The light shielding cover may be formed thick so as to be heightened toward the dome cover around the illumination member.

Consequently, the light shielding cover easily comes into close contact with dome cover 19, and, thus, even in a case where a tilting angle is large, it is possible to further prevent light emitted from the illumination member and then reflected from being incident to the lens. In the light shielding cover, a portion thereof which does not contribute to blocking illumination light can be thinned.

The light shielding cover may have a substantially semicircular shape on a virtual plane perpendicular to lens center axis 81, and may be formed thick so as to be heightened toward dome cover 19 at an end of the substantially semicircular shape on a diameter side.

Consequently, since the end on the diameter side of the substantially semicircular shape of the light shielding cover easily comes into close contact with the inner surface of the cylinder of dome cover 19, even if a tilting angle is large, it is possible to further prevent light emitted from the illumination member and then reflected from being incident to the lens.

The illumination member may be provided on the illumination mount so as to be disposed in one semicircle on an opposite side to a tilt rotation direction in a circumference centering on lens center axis 81.

Consequently, even in a case where a tilting angle is large, the gap between the illumination member and the dome cover is easily shielded by the dome cover. Therefore, it is possible to improve accuracy of minimizing projection of illumination light. Even in a case where a tilting angle is large, the illumination member is not covered with the apparatus main body, and can thus irradiate a subject with illumination light.

The illumination member may be provided on the illumination mount in such a way of being inclined with respect to a virtual plane perpendicular to lens center axis 81.

Consequently, even if LED units 79 are disposed in one semicircle, night vision illumination light can be applied in a desired direction, and thus a subject can be included in a light distribution region. Therefore, the imaging apparatus can capture a clear image even at a dark location.

The present invention is useful for an imaging apparatus, a monitoring camera, and the like capable of improving accuracy of minimizing projection of illumination light.

What is claimed is:

1. An imaging apparatus comprising:
    a dome cover having a housing space that houses a lens module;
    an apparatus main body that is attached with the dome cover;
    a first support that is supported by the apparatus main body in a free pan rotation manner in the housing space of the dome cover;
    a second support member that is supported by the first support member in a free tilt rotation manner and supports the lens module;
    an illumination mount that is provided with an illumination light source and is supported by the second support member; and
    a ring-shaped light shielding cover that is provided on the illumination mount, has an aperture extending around the illumination light source, and contacts an inner surface of the dome cover.

2. The imaging apparatus of claim 1,
    wherein the dome cover has a cylindrical portion connected to a hemispherical portion.

3. The imaging apparatus of claim 1,
    wherein a thickness of the light shielding cover adjacent to the aperture is greater, in a direction toward the dome cover, than a thickness of the light shielding cover spaced from the aperture.

4. The imaging apparatus of claim 3,
    wherein the light shielding cover has a substantially semicircular shape on a virtual plane perpendicular to a lens center axis, and a thickness of the light shielding cover increases toward a direction approaching an end of the substantially semicircular shape on a diameter of the substantially semicircular shape, the thickness of the light shielding cover increasing so that the light shielding cover protrudes toward the dome cover.

5. The imaging apparatus according to claim 3, wherein the light shielding cover includes a fan extending around the aperture and has a greater thickness than a thickness of the light shielding cover other than the fan.

6. The imaging apparatus of claim 1,
    wherein the illumination member source is positioned closer to an end of the illumination mount in a direction opposite to a tilt rotation direction.

7. The imaging apparatus of claim 6,
    wherein the illumination light source is provided on the illumination mount to be inclined with respect to a virtual plane perpendicular to the lens center axis.

8. The imaging apparatus according to claim 1, wherein the aperture of the light shielding cover is positioned on one side of a lens center axis.

9. The imaging apparatus according to claim 1, wherein the light shielding cover further includes a lens exposure hole that exposes a front end of the lens module, the lens exposure hole being independent of the aperture.

10. The imaging apparatus according to claim 9, wherein the aperture comprises two apertures, and the lens exposure hole is positioned between the two apertures.

11. The imaging apparatus of claim 1, wherein
the aperture is positioned closer to an end of the light shielding cover in a direction opposite to a tilt rotation direction.

12. The imaging apparatus of claim 1, wherein
the light shielding cover contacts the dome cover such that a relative position between the light shielding cover and the dome cover does not change after the dome cover is attached to the apparatus main body.

* * * * *